(12) United States Patent
Park et al.

(10) Patent No.: US 9,969,906 B2
(45) Date of Patent: May 15, 2018

(54) RADICAL CURABLE ADHESIVE COMPOSITION, AND POLARIZING PLATE AND OPTICAL MEMBER COMPRISING SAME

(71) Applicant: LG CHEM, LTD., Seoul (KR)

(72) Inventors: Kwang-Seung Park, Daejeon (KR); Mi-Rin Lee, Daejeon (KR); Jun-Wuk Park, Daejeon (KR); Eun-Soo Huh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 197 days.

(21) Appl. No.: 15/024,634

(22) PCT Filed: Sep. 19, 2014

(86) PCT No.: PCT/KR2014/008733
§ 371 (c)(1),
(2) Date: Mar. 24, 2016

(87) PCT Pub. No.: WO2015/046819
PCT Pub. Date: Apr. 2, 2015

(65) Prior Publication Data
US 2016/0237317 A1    Aug. 18, 2016

(30) Foreign Application Priority Data

Sep. 30, 2013 (KR) .................. 10-2013-0117013
Sep. 12, 2014 (KR) .................. 10-2014-0120932

(51) Int. Cl.
*G02B 5/30* (2006.01)
*C09J 4/00* (2006.01)
(Continued)

(52) U.S. Cl.
CPC ....... *C09J 4/00* (2013.01); *G02B 1/08* (2013.01); *G02B 1/14* (2015.01); *G02B 5/305* (2013.01); *G02B 5/3033* (2013.01)

(58) Field of Classification Search
CPC .......... G02B 1/08; G02B 1/14; G02B 5/3033; G02B 5/305; C09J 4/00
(Continued)

(56) References Cited

U.S. PATENT DOCUMENTS 6,683,717 B1 * 1/2004 Miyatake ........... C09K 19/3852
                                                        349/183
8,824,047 B2 * 9/2014 Tomoguchi ............ G02B 1/105
                                                         349/122
(Continued)

FOREIGN PATENT DOCUMENTS

JP     3695480 B2    7/2005
JP     4603781 B2   10/2010
(Continued)

OTHER PUBLICATIONS

International Search Report from PCT/KR2014/008733, dated Dec. 3, 2014.
(Continued)

*Primary Examiner* — Ricky D Shafer
(74) *Attorney, Agent, or Firm* — Dentons US LLP

(57) ABSTRACT

The present invention relates to a radical-curable adhesive composition including an acid anhydride-based compound having at least one carbon-carbon unsaturated double bond, a vinyl-based compound having at least one electron donor group, a radical initiator, and a cation generator, wherein the content of the acid anhydride-based compound and the vinyl-based compound is 0.8 to 1.0 by an equivalence ratio of mixing represented by the following Equation (1), and a polarizing plate and an optical member including the radical-curable adhesive composition:

Equivalence Ratio of Mixing=$M/N$,    Equation(1):

and in Equation (1), M is the number of carbon-carbon unsaturated double bonds capable of participating in polymerization in the molecule including an acid anhydride group included in the acid anhydride-based compound; and N is the number of carbon-carbon unsaturated double bonds capable of participating in polymerization in the molecule included in the vinyl-based compound.

12 Claims, 1 Drawing Sheet protective film
adhesive layer
polarizer

(51) Int. Cl.
*G02B 1/08* (2006.01)
*G02B 1/14* (2015.01)

(58) Field of Classification Search
USPC .................................................. 359/487.02
See application file for complete search history.

(56) References Cited

U.S. PATENT DOCUMENTS

| | | | | |
|---|---|---|---|---|
| 9,428,676 | B2* | 8/2016 | Lee | C09J 163/00 |
| 9,790,403 | B2* | 10/2017 | Huh | C09J 4/00 |
| 2004/0097638 | A1 | 5/2004 | Centner et al. | |
| 2010/0232018 | A1* | 9/2010 | Kobayashi | B32B 7/12 |
| | | | | 359/488.01 |
| 2014/0072731 | A1 | 3/2014 | Seo et al. | |
| 2014/0160406 | A1 | 6/2014 | Huh et al. | |
| 2014/0347730 | A1 | 11/2014 | Takeda et al. | |
| 2015/0099127 | A1 | 4/2015 | Ogawa et al. | |
| 2016/0245957 | A1* | 8/2016 | Park | G02B 1/14 |

FOREIGN PATENT DOCUMENTS

| | | |
|---|---|---|
| JP | 2011076058 A | 4/2011 |
| JP | 2012062471 A | 3/2012 |
| JP | 201377006 A | 4/2013 |
| JP | 2013185133 A | 9/2013 |
| KR | 2013-0020616 A | 2/2013 |
| KR | 2013-0040725 A | 4/2013 |
| KR | 2013-0103290 A | 9/2013 |
| TW | 201343844 A | 11/2013 |

OTHER PUBLICATIONS

Written Opinion of the ISA from PCT/KR2014/008733, dated Dec. 3, 2014.
Office Action of Taiwanese Patent Office in Appl'n No. 103132741, dated Jul. 22, 2015.
Office Action of Korean Patent Office in Appl'n No. 2014-0120932, dated Nov. 11, 2015.

* cited by examiner

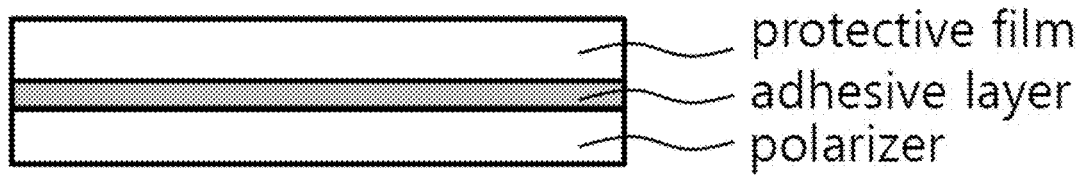

RADICAL CURABLE ADHESIVE COMPOSITION, AND POLARIZING PLATE AND OPTICAL MEMBER COMPRISING SAME

This application is a National Stage Entry of International Application No. PCT/KR2014/008733, filed on Sep. 19, 2014, and claims the benefit of and priority to Korean Application No. 10-2013-0117013, filed on Sep. 30, 2013, and Korean Application No. 10-2014-0120932, filed on Sep. 12, 2014, all of which are incorporated herein by reference in their entirety for all purposes as if fully set forth herein.

TECHNICAL FIELD

The present disclosure relates to a radical-curable adhesive composition, and a polarizing plate and an optical member including the same, and in particular, to a radical-curable adhesive composition capable of securing adhesive strength through covalent bonding instead of hydrogen bonding, and a polarizing plate and an optical member including the same.

BACKGROUND ART

A structure in which a protective film is laminated on one or both surfaces of a polarizer formed with a polyvinyl alcohol (hereinafter, referred to 'PVA')-based resin using an adhesive have been commonly used. Triacetyl cellulose (TAC)-based films have been normally used as a polarizing plate protective film in the art, however, such TAC films have a problem of being readily deformed in high temperature and high humidity environments. Accordingly, protective films made of various materials capable of replacing TAC films have been recently developed, and for example, a method of using polyethylene terephthalate (PET), a cycloolefin polymer (COP), and an acryl-based film either alone or as a mixture thereof has been proposed.

Herein, aqueous adhesives formed with an aqueous solution of a polyvinyl alcohol-based resin are normally used as an adhesive used to attach the polarizer and the protective film. However, aqueous adhesives have a problem in that the use is limited depending on the material of a film, since adhesive strength is weak when acryl-based films or COP films and the like are used as the protective film instead of TAC. In addition to the problem of adhesive strength defects depending on the materials, the aqueous adhesive also has problems in that curls are generated in a polarizing plate due to a drying process of the aqueous adhesive, and initial optical properties are degraded when materials of the protective film used on both surfaces of a PVA element are different. Moreover, a drying process is absolutely required when the aqueous adhesive is used, and differences in moisture permeability, heat expansion and the like occur in the drying process leading to a problem of a defect rate increase. As an alternative to solve the problems described above, methods of using non-aqueous adhesives instead of aqueous adhesives have been proposed.

Meanwhile, non-aqueous adhesives for a polarizing plate that have been proposed so far mostly use ultraviolet-curable adhesives curing adhesive compositions by UV irradiation, and most of these ultraviolet-curable adhesives secure adhesive strength through hydrogen bonding between a hydroxyl group of a polarizer formed with a PVA-based resin and a hydrophilic functional group of an ultraviolet-curable adhesive. However, when hydrogen bonding is used as described above, water molecules are also capable of hydrogen bonding with a hydroxyl group of the polarizer formed with a PVA-based resin or a hydrophilic functional group of the ultraviolet-curable adhesive under a high humidity atmosphere, therefore, there is a disadvantage in that the number of hydrogen bonding between a hydroxyl group of the polarizer formed with a PVA-based resin and a hydrophilic functional group of the ultraviolet-curable adhesive is reduced, which leads to the reduction of adhesive strength.

In view of the above, researches on securing adhesive strength through covalent bonding instead of hydrogen bonding have been actively conducted, and among these, researches particularly on ultraviolet-curable adhesives including an epoxy compound have been most active. In the case of ultraviolet-curable adhesives including an epoxy compound, a ring-opening reaction between an epoxy compound and a hydroxyl group of a polarizer formed with a PVA-based resin occurs during the curing by ultraviolet radiation, and covalent bonding is produced by the ring-opening reaction, and therefore, excellent adhesive strength may be secured even under a high humidity atmosphere. However, curing of such ultraviolet-curable adhesives including an epoxy compound is progressed using a cation method rather than using a radical method, therefore, there are many disadvantages in the manufacturing process due to a low curing speed and a low degree of curing.

Accordingly, radical-curable adhesives having a high curing speed and a high degree of curing by progressing the curing using a radical method, and capable of securing adhesive strength through covalent bonding instead of hydrogen bonding thereby having excellent water resistance have been required.

Meanwhile, in another aspect, display devices having a structure in which a polarizing plate is attached to an upper and/or a lower substrate of a display panel that generates images using an adhesive have been generally used, and in order to obtain thin display devices, a method of laminating a protective film on only one surface of a polarizer using an adhesive, and directly attaching the surface of the polarizer opposite to the protective film-laminated surface to a display panel through an adhesive as a medium without a protective film has been proposed.

Herein, acryl-based adhesives are normally used as an adhesive used to attach a polarizing plate having the structure described above to a display panel. However, as for the acryl-based adhesive, at least a thickness of 20 μm is commonly required in order to maintain proper adhesive strength, and therefore, there is a problem in that the trend of display devices being thinner and lighter is not satisfied. In addition, in the case of acryl-based adhesives, an adhesive layer is generally formed using a method of applying an adhesive composition on a releasing film, drying the solvent, and then transferring the result on a sample surface, and this method has disadvantages in that the method is inconvenient when attaching a polarizing plate to a display device, and productivity decreases. Particularly, the acryl-based adhesive commonly has a glass transition temperature of 0° C. or less, and when this adhesive is directly attached to a polarizer and used, there is a problem in that heat resistance reliability is reduced, such that cracks occur in the polarizer in a thermal shock reliability test.

Accordingly, new attaching means capable of being formed to a thin film, improving productivity when attaching a polarizing plate and a display panel, and having superior heat resistance reliability has been required.

DISCLOSURE

Technical Problem

In view of the above, an object of the present invention is to provide a radical-curable adhesive composition having a high curing speed and a high degree of curing by progressing the curing using a radical method, and capable of securing adhesive strength through covalent bonding instead of hydrogen bonding thereby having excellent water resistance, capable of being formed to a thin film, and capable of being used in attaching a polarizer and a display panel as well as used in attaching a polarizer and a protective film, and a polarizing plate and an optical member including the radical-curable adhesive composition.

Technical Solution

In one aspect, the present invention provides a radical-curable adhesive composition including an acid anhydride-based compound having at least one carbon-carbon unsaturated double bond, a vinyl-based compound having at least one electron donor group, a radical initiator, and a cation generator, wherein the content of the acid anhydride-based compound and the vinyl-based compound is 0.8 to 1.0 by an equivalence ratio of mixing represented by the following Equation (1).

$$\text{Equivalence Ratio of Mixing} = M/N \quad \text{Equation (1):}$$

In Equation (1), M is the number of carbon-carbon unsaturated double bonds capable of participating in polymerization in the molecule including an acid anhydride group included in the acid anhydride-based compound; and N is the number of carbon-carbon unsaturated double bonds capable of participating in polymerization in the molecule included in the vinyl-based compound.

Meanwhile, the acid anhydride-based compound may include one or more types of compounds selected from the group consisting of compounds represented by the following [Chemical Formula I] to [Chemical Formula IV].

[Chemical Formula I]

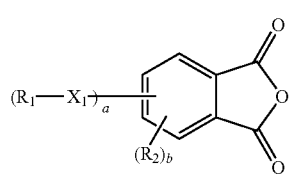

In [Chemical Formula I], $R_1$ is a (meth)acryloyl group, a (meth)acryloylalkyl group, or a (meth)acryloyloxyalkyl group; $R_2$ is a halogen atom or a $C_{1\sim10}$ alkyl group; a is an integer of 1 or 2; b is an integer of 0 to 2; and $X_1$ is a single bond, —O—, —CO—, —COO— or —OCO—.

[Chemical Formula II]

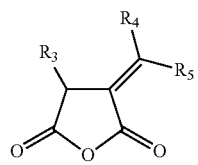

In [Chemical Formula II], $R_3$ to $R_5$ are each independently hydrogen or a halogen atom; or a $C_{1\sim10}$ alkyl group, a $C_{4\sim14}$ cycloalkyl group, a $C_{6\sim14}$ aryl group or a combination thereof.

[Chemical Formula III]

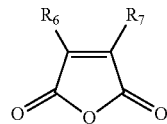

In [Chemical Formula III], $R_6$ and $R_7$ are each independently hydrogen or a halogen atom; or a $C_{1\sim10}$ alkyl group, a $C_{4\sim14}$ cycloalkyl group, a $C_{6\sim14}$ aryl group or a combination thereof.

[Chemical Formula IV]

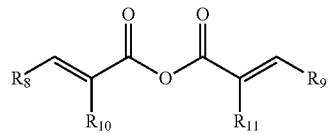

In [Chemical Formula IV], $R_8$ to $R_{11}$ are each independently hydrogen or a halogen atom; or a $C_{1\sim10}$ alkyl group, a $C_{4\sim14}$ cycloalkyl group, a $C_{6\sim14}$ aryl group or a combination thereof.

Meanwhile, the electron donor group of the vinyl-based compound is preferably a functional group represented by the following [Chemical Formula A] or [Chemical Formula B].

[Chemical Formula A]

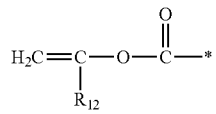

In [Chemical Formula A], $R_{12}$ is hydrogen or a $C_{1\sim10}$ alkyl group.

[Chemical Formula B]

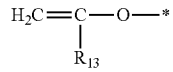

In [Chemical Formula B], $R_{13}$ is hydrogen or a $C_{1\sim10}$ alkyl group.

More specifically, the vinyl-based compound may be a compound represented by the following [Chemical Formula V].

[Chemical Formula V]

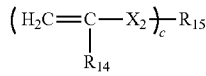

In [Chemical Formula V], $R_{14}$ is hydrogen or a $C_{1\sim10}$ alkyl group; $R_{15}$ is a $C_{1\sim10}$ aliphatic chain, a $C_{4\sim14}$ aliphatic ring or a $C_{6\sim14}$ aromatic ring, which has a valency of c, or a combination thereof; c is an integer of 1 to 4; and $X_2$ is —O— or —OCO—.

Meanwhile, the radical-curable adhesive composition of the present invention may further include a radical-polymerizable compound represented by the following [Chemical Formula VI].

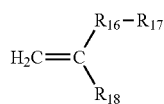

[Chemical Formula VI]

In [Chemical Formula VI], $R_{16}$ is an ester group (—COO—), an amide group (—CON—), or a thioate group (—COS—); $R_{17}$ is a $C_{1\sim10}$ alkyl group, a $C_{4\sim10}$ cycloalkyl group or a combination thereof, and herein, $R_{17}$ has at least one hydroxyl substituent in the molecule; and $R_{18}$ is hydrogen or a $C_{1\sim10}$ alkyl group.

Meanwhile, the radical-curable adhesive composition preferably includes the acid anhydride-based compound and a vinyl-based compound in 1 to 50 parts by weight; the radical-polymerizable compound in 40 to 97 parts by weight; the radical initiator in 1 to 10 parts by weight; and the cation generator in 1 to 10 parts by weight, with respect to 100 parts by weight of the radical-curable adhesive composition.

Meanwhile, the radical-curable adhesive composition preferably has a glass transition temperature of 60° C. or higher after curing.

In addition, the radical-curable adhesive composition preferably has viscosity of 10 to 200 cP.

In another aspect, the present invention provides a polarizing plate including a polyvinyl alcohol-based polarizer; an adhesive layer formed on at least one surface of the polarizer; and a protective film formed on the adhesive layer, wherein the adhesive layer is formed using the radical-curable adhesive composition.

Herein, the polarizer and the adhesive layer preferably secure adhesive strength through covalent bonding produced as a result of an esterification reaction between a hydroxyl group of the polarizer and an acid anhydride group of the adhesive layer.

In still another aspect, the present invention provides an optical member including a display panel; and a polyvinyl alcohol-based polarizer attached to an external-most surface of the display panel through a medium of an adhesive layer, wherein the adhesive layer is formed using the radical-curable adhesive composition.

Herein, the polarizer and the adhesive layer preferably secure adhesive strength through covalent bonding produced as a result of an esterification reaction between a hydroxyl group of the polarizer and an acid anhydride group of the adhesive layer.

Advantageous Effects

A radical-curable adhesive composition according to the present invention has a high curing speed and a high degree of curing since the curing is progressed using radical curing. In addition, a radical-curable adhesive composition of the present invention has excellent adhesive strength since adhesive strength is secured through covalent bonding instead of hydrogen bonding, and furthermore, has excellent water resistance. A radical-curable adhesive composition according to the present invention also has a high glass transition temperature after curing, therefore, has excellent heat resistance.

Moreover, a radical-curable adhesive composition according to the present invention may also be used for attaching a polarizer and a display panel, and in this case, the composition may be formed to a thin film when compared to generally-used acryl-based adhesives and the like, and an adhesive layer may be formed between the polarizer and the display panel using an in-line process, therefore, excellent productivity may be obtained. In addition, the composition has excellent heat resistance reliability compared to generally-used acryl-based adhesives and the like.

BRIEF DESCRIPTION OF DRAWINGS

FIG. 1 is a diagram illustrating a polarizer having an adhesive and a protective layer formed on the upper side of the polarizer.

MODE FOR DISCLOSURE

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

1. Radical-Curable Adhesive Composition

As a result of extensive studies, the inventors of the present invention have found that, when a vinyl-based compound having at least one electron donor group, a radical initiator and a cation generator are mixed to an acid anhydride-based compound having at least one carbon-carbon unsaturated double bond and the result is used as a radical-curable adhesive composition, adhesive strength with a polarizer may be secured through covalent bonding instead of hydrogen bonding, and as a result, excellent water resistance and heat resistance as well as excellent adhesive strength may be secured, and completed the present invention.

More specifically, a radical-curable adhesive composition of the present invention includes an acid anhydride-based compound having at least one carbon-carbon unsaturated double bond, a vinyl-based compound having at least one electron donor group, a radical initiator, and a cation generator, wherein the content of the acid anhydride-based compound and the vinyl-based compound is 0.8 to 1.0 by an equivalence ratio of mixing represented by the following Equation (1).

Equation (1): Equivalence Ratio of Mixing=$M/N$

In Equation (1), M is the number of carbon-carbon unsaturated double bonds capable of participating in polymerization in the molecule including an acid anhydride group included in the acid anhydride-based compound; and N is the number of carbon-carbon unsaturated double bonds capable of participating in polymerization in the molecule included in the vinyl-based compound.

1-1. Acid Anhydride-Based Compound

First, the acid anhydride-based compound in the present invention is a component allowing the curing of an adhesive through radical curing, and furthermore, securing adhesive strength through covalent bonding by an esterification reaction with a hydroxyl group of a polarizer, and various acid anhydride-based compounds capable of radical curing by including at least one carbon-carbon unsaturated double bond may be used.

Meanwhile, although not limited thereto, at least one carbon-carbon unsaturated double bond of the acid anhydride-based compound is preferably conjugated with at least one carbonyl group of the acid anhydride group for more superior radical curing.

In the present invention, examples of the acid anhydride-based compound may include, but are not limited to, one or more types of compounds selected from the group consisting of compounds represented by the following [Chemical Formula I] to [Chemical Formula IV].

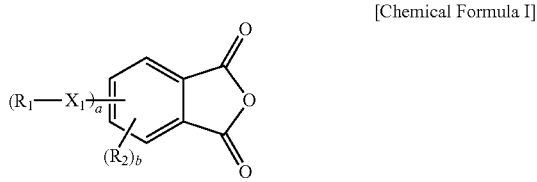

[Chemical Formula I]

In [Chemical Formula I], $R_1$ is a (meth)acryloyl group, a (meth)acryloylalkyl group or a (meth)acryloyloxyalkyl group; $R_2$ is a halogen atom or a $C_{1\sim10}$ alkyl group; a is an integer of 1 or 2; b is an integer of 0 to 2; and $X_1$ is a single bond, —O—, —CO—, —COO— or —OCO—.

Herein, in $R_1$, the alkyl group of the (meth)acryloylalkyl group means a linear or branched hydrocarbon part of 1 to 10, 1 to 8, or 1 to 4 carbon atoms, and the alkyl group in the present specification may include at least one unsaturated bond in the molecule. Herein, the (meth)acryloyl group of the (meth)acryloylalkyl group may position at any position of the alkyl group. In other words, the (meth)acryloyl group may position at the end of the alkyl group, or in the middle of the alkyl group. In addition, the rest of the hydrogen atoms included in the alkyl group may be substituted with any substituent.

In addition, in $R_1$, the alkyl group of the (meth)acryloyloxyalkyl group means a linear or branched hydrocarbon part of 1 to 10, 1 to 8, or 1 to 4 carbon atoms, and the alkyl group in the present specification may include at least one unsaturated bond in the molecule. Herein, the (meth)acryloyloxy group of the (meth)acryloyloxyalkyl group may position at any position of the alkyl group. In other words, the (meth)acryloyloxy group may position at the end of the alkyl group, or in the middle of the alkyl group. In addition, the rest of the hydrogen atoms included in the alkyl group may be substituted with any substituent.

Furthermore, in $R_2$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

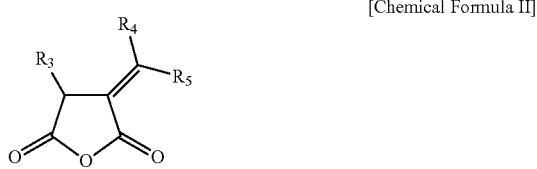

[Chemical Formula II]

In [Chemical Formula II], $R_3$ to $R_5$ are each independently hydrogen or a halogen atom; or a $C_{1\sim10}$ alkyl group, a $C_{4\sim14}$ cycloalkyl group, a $C_{6\sim14}$ aryl group or a combination thereof.

Herein, in $R_3$ to $R_5$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In addition, in $R_3$ to $R_5$, the cycloalkyl group means a nonaromatic monocyclic, bicyclic or tricyclic hydrocarbon part of 4 to 14, 4 to 10, or 4 to 6 ring carbons, and the cycloalkyl group in the present specification may include at least one unsaturated bond. Meanwhile, examples of the cycloalkyl group may include, but are not limited to, a cyclopentane ring, cyclopentene ring, a cyclohexane ring, a cyclohexene ring and the like.

Furthermore, in $R_3$ to $R_5$, the aryl group means a monocyclic, bicyclic or tricyclic aromatic hydrocarbon part having 6 to 14, or 6 to 12 ring atoms, and examples thereof may include, but are not limited to, a benzene ring, a naphthalene ring, an anthracene ring, a biphenyl ring and the like.

Meanwhile, among the groups shown above, $R_3$ to $R_5$ are, although not limited thereto, preferably each independently hydrogen, a halogen atom or a $C_{1\sim10}$ alkyl group, more preferably hydrogen, a halogen atom or a $C_{1\sim6}$ alkyl group, and even more preferably hydrogen, a halogen atom or a $C_{1\sim4}$ alkyl group.

[Chemical Formula III]

In [Chemical Formula III], $R_6$ and $R_7$ are each independently hydrogen or a halogen atom; or a $C_{1\sim10}$ alkyl group, a $C_{4\sim14}$ cycloalkyl group, a $C_{6\sim14}$ aryl group or a combination thereof.

Herein, in $R_6$ and $R_7$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In addition, in $R_6$ and $R_7$, the cycloalkyl group means a nonaromatic monocyclic, bicyclic or tricyclic hydrocarbon part of 4 to 14, 4 to 10, or 4 to 6 ring carbons, and the cycloalkyl group in the present specification may include at least one unsaturated bond in the molecule. Meanwhile, examples of the cycloalkyl group may include, but are not limited to, a cyclopentane ring, a cyclopentene ring, a cyclohexane ring, a cyclohexene ring and the like.

Furthermore, in $R_6$ and $R_7$, the aryl group means a monocyclic, bicyclic or tricyclic aromatic hydrocarbon part having 6 to 14, or 6 to 12 ring atoms, and examples thereof may include, but are not limited to, a benzene ring, a naphthalene ring, an anthracene ring, a biphenyl ring and the like.

Meanwhile, among the groups shown above, $R_6$ and $R_7$ are, although not limited thereto, preferably each independently hydrogen, a halogen atom or a $C_{1\sim10}$ alkyl group, more preferably hydrogen, a halogen atom or a $C_{1\sim6}$ alkyl group, and even more preferably hydrogen, a halogen atom or a $C_{1\sim4}$ alkyl group.

[Chemical Formula IV]

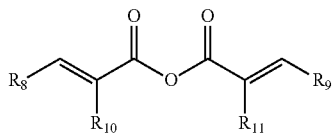

In [Chemical Formula IV], $R_8$ to $R_{11}$ are each independently hydrogen or a halogen atom; or a $C_{1\sim10}$ alkyl group, a $C_{4\sim14}$ cycloalkyl group, a $C_{6\sim14}$ aryl group or a combination thereof.

Herein, in $R_8$ to $R_{11}$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In addition, in $R_8$ to $R_{11}$, the cycloalkyl group means a nonaromatic monocyclic, bicyclic or tricyclic hydrocarbon part of 4 to 14, 4 to 10, or 4 to 6 ring carbons, and the cycloalkyl group in the present specification may include at least one unsaturated bond in the molecule. Meanwhile, examples of the cycloalkyl group may include, but are not limited to, a cyclopentane ring, a cyclopentene ring, a cyclohexane ring, a cyclohexene ring and the like.

Furthermore, in $R_8$ to $R_{11}$, the aryl group means a monocyclic, bicyclic or tricyclic aromatic hydrocarbon part having 6 to 14, or 6 to 12 ring atoms, and examples thereof may include, but are not limited to, a benzene ring, a naphthalene ring, an anthracene ring, a biphenyl ring and the like.

Meanwhile, among the groups shown above, $R_8$ to $R_{11}$ are, although not limited thereto, preferably each independently hydrogen, a halogen atom or $C_{1\sim10}$ alkyl group, more preferably hydrogen, a halogen atom or $C_{1\sim8}$ alkyl group, and even more preferably hydrogen, a halogen atom or $C_{1\sim4}$ alkyl group.

More specifically, examples of the compounds represented by [Chemical Formula I] to [Chemical Formula IV] may include, but are not limited to, compounds represented by the following [Chemical Formula 1] to [Chemical Formula 6], and the like. These may be used either alone or as a mixture.

[Chemical Formula 1]

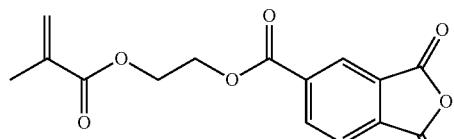

[Chemical Formula 2]

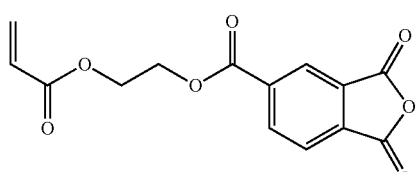

[Chemical Formula 3]

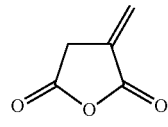

[Chemical Formula 4]

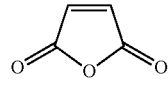

[Chemical Formula 5]

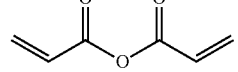

[Chemical Formula 6]

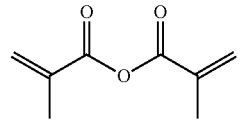

1-2. Vinyl-Based Compound

Next, the vinyl-based compound in the present invention forms a charge complex with the acid anhydride-based compound by an electron donor group when the adhesive composition is cured, and consequently, goes through a copolymerization reaction with the acid anhydride-based compound allowing very effective radical curing.

Meanwhile, the vinyl-based compound may be used without particular limit as long as the compound has an electron donor group and thereby forms a charge complex with the acid anhydride-based compound when an adhesive composition is cured. However, the vinyl-based compound in the present specification means excluding compounds overlapped with radical-polymerizable compounds to be described, except for the examples listed below.

Meanwhile, although not limited thereto, the electron donor group of the vinyl-based compound is preferably a functional group represented by the following [Chemical Formula A] or [Chemical Formula B]. In this case, a charge complex with the acid anhydride-based compound may be formed more excellently.

[Chemical Formula A]

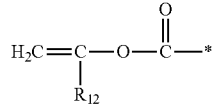

In [Chemical Formula A], $R_{12}$ is hydrogen or a $C_{1\sim10}$ alkyl group.

Herein, in $R_{12}$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

[Chemical Formula B]

In [Chemical Formula B], $R_{13}$ is hydrogen or a $C_{1\sim10}$ alkyl group.

Herein, in $R_{13}$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In the present invention, examples of the vinyl-based compound may include, but are not limited to, compounds represented by the following [Chemical Formula V].

[Chemical Formula V]

$$\left( H_2C=\underset{R_{14}}{\overset{}{C}}-X_2 \right)_c R_{15}$$

In [Chemical Formula V], $R_{14}$ is hydrogen or a $C_{1\sim10}$ alkyl group; $R_{15}$ is a $C_{1\sim10}$ aliphatic chain, a $C_{4\sim14}$ aliphatic ring or a $C_{6\sim14}$ aromatic ring, which has a valency of c, or a combination thereof; c is an integer of 1 to 4; and $X_2$ is —O— or —OCO—.

Herein, in $R_{14}$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In addition, in $R_{15}$, the aliphatic chain means a linear or branched saturated or unsaturated trivalent hydrocarbon part of 1 to 10, 1 to 8, or 1 to 4 carbon atoms, and examples thereof may include, but are not limited to, a trivalent alkane chain such as a methane chain, an ethane chain, a propane chain, a butane chain, a pentane chain, a hexane chain, a heptane chain, an octane chain, a nonane chain and a decane chain. One or more hydrogen atoms included in the aliphatic hydrocarbon chain may be substituted with any substituent.

Furthermore, in $R_{15}$, the aliphatic ring means a saturated or unsaturated monocyclic, bicyclic or tricyclic nonaromatic trivalent hydrocarbon part of 4 to 14, 4 to 10, or 4 to 6 ring carbons, and examples thereof may include, but are not limited to a trivalent, cycloalkane ring such as a cyclopentane ring and a cyclohexane ring, or a trivalent, cycloalkene ring such as a cyclopentene ring, a cyclohexene ring and a cyclooctene ring. One or more hydrogen atoms included in the aliphatic hydrocarbon ring may be substituted with any substituent.

In addition, in $R_{15}$, the aromatic ring means a trivalent monocyclic, bicyclic or tricyclic aromatic hydrocarbon part having 6 to 14, or 6 to 12 ring atoms, and examples thereof may include, but are not limited to a trivalent, benzene ring, naphthalene ring, anthracene ring, biphenyl ring and the like. One or more hydrogen atoms included in the aromatic hydrocarbon ring may be substituted with any substituent.

More specifically, examples of the compound represented by [Chemical Formula V] may include, but are not limited to, compounds represented by the following [Chemical Formula 7] to [Chemical Formula 17], and the like. These may be used either alone or as a mixture.

[Chemical Formula 7]

[Chemical Formula 8]

[Chemical Formula 9]

[Chemical Formula 10]

[Chemical Formula 11]

[Chemical Formula 12]

[Chemical Formula 13]

[Chemical Formula 14]

[Chemical Formula 15]

[Chemical Formula 16]

[Chemical Formula 17]

1-3. Equivalence Ratio of Mixing

Meanwhile, the content of the acid anhydride-based compound and the vinyl-based compound is 0.8 to 1.0 by an equivalence ratio of mixing represented by the following Equation (1), preferably approximately 0.9 to 1.0, and particularly approximately 1.0.

Equation (1): Equivalence Ratio of Mixing = $M/N$

M is the number of carbon-carbon unsaturated double bonds capable of participating in polymerization in the molecule including an acid anhydride group included in the acid anhydride-based compound, and N is the number of carbon-carbon unsaturated double bonds capable of participating in polymerization in the molecule included in the vinyl-based compound.

For example, in the radical-curable adhesive composition, M, the number of carbon-carbon unsaturated double bonds capable of participating in polymerization included in the acid anhydride-based compound, is the sum of (the number of carbon-carbon unsaturated double bonds capable of participating in the polymerization of each acid anhydride-based compound)×(a molar fraction of the corresponding acid anhydride-based compound), and also, N, the number of carbon-carbon unsaturated double bonds capable of participating in polymerization included in the vinyl-based compound, is the sum of (the number of carbon-carbon unsaturated double bonds capable of participating in the polymerization of each vinyl-based compound)×(a molar fraction of the corresponding vinyl-based compound).

In the radical-curable adhesive composition of the present invention, the acid anhydride-based compound and the vinyl-based compound may form a charge complex when the acid anhydride-based compound and the vinyl-based compound are included so as to satisfy the range of the equivalence ratio of mixing described above, and as a result, excellent radical curing by copolymerization may be obtained.

1-4. Radical Initiator

Next, the radical initiator included in the radical-curable adhesive composition according to the present invention is for enhancing a curing rate by facilitating radical polymerization, and radical initiators generally used in the art may be used without limit as the radical initiator.

More specifically, examples of the radical initiator may include one or more types selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methyl benzoylformate, oxy-phenyl-acetic acid-2-[2-oxo-2-phenyl-acetoxyethoxy]-ethyl ester, oxy-phenyl-acetic acid-2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide and phenylbis(2,4,6-trimethylbenzoyl)-phosphine oxide. Particularly, in the present invention, phenylbis(2,4,6-trimethylbenzoyl)-phosphine oxide may be preferably used.

Meanwhile, the content of the radical initiator is preferably, for example, approximately, 1 to 10 parts by weight, 1 to 5 parts by weight or 2 to 4 parts by weight, with respect to 100 parts by weight of the radical-curable adhesive composition. When the content of the radical initiator satisfies the above range, curing of an adhesive may be smoothly accomplished.

1-5. Cation Generator

Next, the cation generator included in the radical-curable adhesive composition according to the present invention transfers a cation (H+) to the acid anhydride-based compound when an adhesive is cured, and thereby plays a role of a catalyst facilitating an esterification reaction with a hydroxyl group of a polarizer. Accordingly, excellent adhesive strength with a polarizer may be secured through covalent bonding produced by an esterification reaction even under low temperature conditions since the present invention uses a cation generator.

Herein, the cation generator capable of being used in the present invention preferably includes, for example, a sulfonium salt or an iodonium salt. Specific examples of the cation generator including a sulfonium salt or an iodonium salt may include one or more types selected from the group consisting of diphenyl(4-phenylthio)phenylsulfonium hexafluoroantimonate, diphenyl(4-phenylthio)phenylsulfonium hexafluorophosphate, (phenyl) [4-(2-methylpropyl)phenyl]-iodonium hexafluorophosphate, (thiodi-4,1-phenylene)bis(diphenylsulfonium) dihexafluoroantimonate and (thiodi-4,1-phenylene)bis(diphenylsulfonium) dihexafluorophosphate, but are not limited thereto.

Meanwhile, the content of the cation generator may be, for example, 10 parts by weight or less, and preferably 1 to 10 parts by weight, 2 to 8 parts by weight, or 2 to 6 parts by weight, with respect to 100 parts by weight of the radical-curable adhesive composition. When the content of the cation generator included in the radical-curable adhesive composition according to the present invention satisfies the above range, the esterification reaction smoothly occurs.

1-6. Additional Composition

Meanwhile, the radical-curable adhesive composition of the present invention may further include a radical-polymerizable compound represented by the following [Chemical Formula VI] so that an adhesive film becomes more rigid through the reaction of the hydroxyl group with the acid anhydride while maintaining adhesive strength.

[Chemical Formula VI]

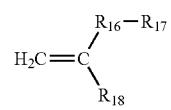

In [Chemical Formula VI], $R_{16}$ is an ester group (—COO—), an amide group (—CON—) or a thioate group (—COS—); $R_{17}$ is a $C_{1\sim10}$ alkyl group, a $C_{4\sim10}$ cycloalkyl group or a combination thereof, and herein, $R_{17}$ has at least one hydroxyl substituent in the molecule; and $R_{18}$ is hydrogen or a $C_{1\sim10}$ alkyl group.

Herein, in $R_{17}$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In addition, in $R_{17}$, the cycloalkyl group means a non-aromatic monocyclic, bicyclic or tricyclic hydrocarbon part of 4 to 14, 4 to 10, or 4 to 6 ring carbons, and the cycloalkyl group in the present specification may include at least one unsaturated bond. Meanwhile, examples of the cycloalkyl group may include, but are not limited to, a cyclopentane ring, a cyclohexane ring and the like.

Meanwhile, the hydroxyl group may substitute any position of the alkyl group or the cycloalkyl group. For example, the hydroxyl group may position at the end of the alkyl group, or in the middle of the alkyl group. Meanwhile, the rest of the hydrogen atoms included in the alkyl group or the cycloalkyl group may be substituted with any substituent.

In addition, in $R_{18}$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like. One or more hydrogen atoms included in the alkyl group may be substituted with any substituent.

More specifically, examples of the radical-polymerizable compound may include, but are not limited to, compounds represented by the following [Chemical Formula 18] to [Chemical Formula 28]. These may be used either alone or as a mixture.

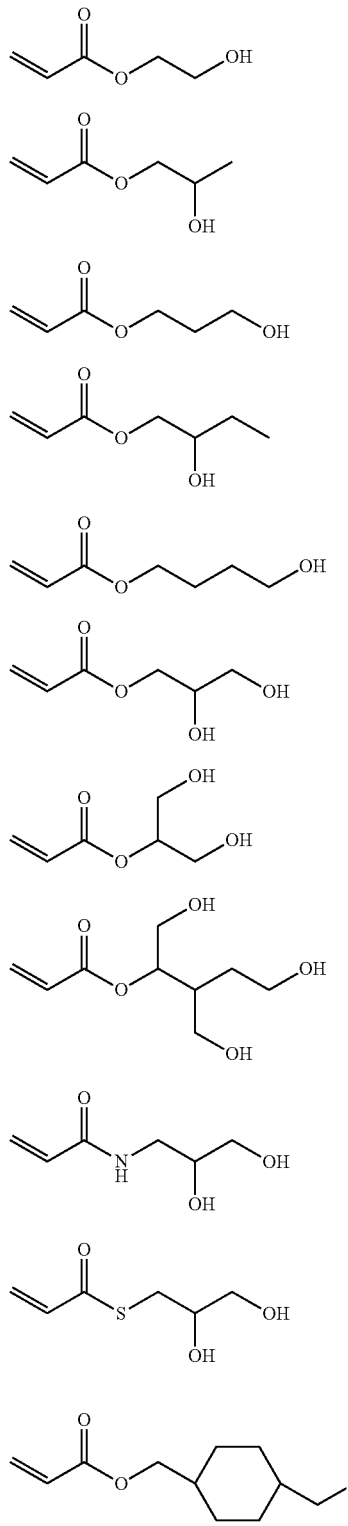

Meanwhile, when the radical-polymerizable compound is further included as described above, the radical-curable adhesive composition of the present invention preferably includes the acid anhydride-based compound and the vinyl-based compound in 1 to 50 parts by weight; the radical-polymerizable compound in 40 to 97 parts by weight; the radical initiator in 1 to 10 parts by weight; and the cation generator in 1 to 10 parts by weight, with respect to 100 parts by weight of the adhesive composition. Herein, the content of the acid anhydride-based compound and the vinyl-based compound means a total content of the two compounds added in the equivalence ratio as described above.

More specifically, the content of the acid anhydride-based compound and the vinyl-based compound may be approximately 1 to 50 parts by weight, preferably approximately 5 to 45 parts by weight, and more preferably approximately 10 to 40 parts by weight, with respect to 100 parts by weight of the whole adhesive composition. When the content of the acid anhydride-based compound and the vinyl-based compound satisfies the above range, adhesive strength is particularly superior, and problems such as viscosity increase do not occur.

In addition, the content of the radical-polymerizable compound may be approximately 40 to 97 parts by weight, preferably approximately 45 to 90 parts by weight, and more preferably approximately 50 to 80 parts by weight, with respect to 100 parts by weight of the whole adhesive composition. When the content of the radical-polymerizable compound satisfies the above range, more excellent adhesive strength may be secured.

Furthermore, the content of the radical initiator may be approximately 1 to 10 parts by weight, preferably approximately 1 to 5 parts by weight, and more preferably approximately 2 to 4 parts by weight, with respect to 100 parts by weight of the whole adhesive composition. When the content of the radical initiator satisfies the above range, curing of an adhesive may be smoothly accomplished.

In addition, the content of the cation generator may be approximately 1 to 10 parts by weight, preferably approximately 2 to 8 parts by weight, and more preferably approximately 2 to 6 parts by weight, with respect to 100 parts by weight of the whole adhesive composition. When the content of the cation generator satisfies the above range, an esterification reaction may effectively occur.

1-7. Physical Properties of Composition

Meanwhile, the radical-curable adhesive composition according to the present invention preferably has a glass transition temperature of 60° C. or higher after curing, for example, approximately 60 to 200° C., 65 to 150° C. or 70 to 120° C. A polarizing plate prepared using the radical-curable adhesive composition according to the present invention having a glass transition temperature in the range described above has an advantage in that heat resistance is excellent.

In addition, the radical-curable adhesive composition according to the present invention preferably has viscosity of approximately 10 to 200 cP, or 20 to 100 cP. When the viscosity of the adhesive composition satisfies the above range, there is an advantage in that the adhesive layer may be formed to be thin, and workability is excellent due to low viscosity.

Furthermore, the thickness of an adhesive layer formed using the radical-curable adhesive composition may be approximately 0.5 to 10 μm, and preferably approximately 1 μm to 5 μm. When the thickness of an adhesive layer is less than 0.5 μm, uniformity and adhesive strength of the adhesive layer may be reduced, and when the thickness of an adhesive layer is greater than 10 μm, forming to a thin film is difficult, and there may be a problem of the exterior of a polarizing plate including this adhesive layer getting wrinkled.

Meanwhile, the radical-curable adhesive composition of the present invention described above has excellent adhesive strength for films made of various materials, and in addition to this, maintains excellent adhesive strength for a long period of time even in high humidity environments since adhesive strength is secured through covalent bonding instead of hydrogen bonding, and therefore, the radical-curable adhesive composition of the present invention may be favorably used for a polarizing plate. Herein, the radical-curable adhesive composition according to the present invention has a high curing speed and a high degree of curing since the curing is progressed by radical curing, therefore, there is an advantage in that productivity may increase when a polarizing plate is prepared.

In addition, the radical-curable adhesive composition of the present invention described above may also exhibit excellent adhesive strength between a polarizer and a display panel, may form an adhesive layer as a thin film, has excellent heat resistance reliability, and furthermore, has excellent productivity in that the adhesive layer may be formed between the polarizer and the display panel using an in-line process, and therefore, the radical-curable adhesive composition of the present invention may also be favorably used when directly attaching a polarizer to a display panel.

Hereinafter, a polarizing plate and an optical member including the radical-curable adhesive composition of the present invention will be specifically described.

2. Polarizing Plate

First, a polarizing plate according to the present invention will be described.

A polarizing plate of the present invention includes a polarizer; an adhesive layer formed on at least one surface of the polarizer; and a protective film formed on the adhesive layer, wherein the adhesive layer is formed using the radical-curable adhesive composition of the present invention described above.

2-1. Polarizer

First, the polarizer is not particularly limited, and polarizers well known in the art, for example, films formed with polyvinyl alcohol (PVA) including iodine or dichroic dye may be used. The polarizer may be prepared by dyeing a PVA film with iodine or dichroic dye, however, the preparation method is not particularly limited. In the present specification, a polarizer means a state not including a protective film, and a polarizing plate means a state including a polarizer and a protective film.

2-2. Adhesive Layer

Next, the adhesive layer is formed using the radical-curable adhesive composition according to the present invention described above, and may be formed using methods well known in the art. For example, a method of forming an adhesive layer by applying an adhesive composition on one surface of a polarizer or a protective film, laminating the polarizer and the protective film, and then curing the result may be used. Herein, the application may be carried out using coating methods well known in the art, such as spin coating, bar coating, roll coating, gravure coating, and blade coating.

Meanwhile, the curing may be carried out by photocuring, more specifically, irradiating active energy rays such as ultraviolet rays, visible rays, an electron beam and X-rays. For example, the curing may be carried out using a method of irradiating ultraviolet rays of approximately 10 to 2500 mJ/cm$^2$ using an ultraviolet ray irradiator (metal halide lamp).

2-3. Protective Film

Next, the protective film is used for supporting and protecting a polarizer, and protective films made of various materials generally known in the art, such as cellulose-based films, polyethylene terephthalate (PET) films, cycloolefin polymer (COP) films and acryl-based films, may be used without limit. Among these, using an acryl-based film is particularly preferable considering optical properties, durability, economic efficiency and the like.

Meanwhile, an acryl-based film capable of being used in the present invention may be obtained by extrusion molding materials to be molded including a (meth)acrylate-based resin as a main component. Herein, the (meth)acrylate-based resin is a material having a resin including a (meth)acrylate-based unit as a main component, and the concept also includes not only a homopolymer resin formed with a (meth)acrylate-based unit, but also a copolymer resin copolymerizing other monomer units in addition to a (meth)acrylate-based unit, and a blend resin blending other resins to such a (meth)acrylate-based resin.

Meanwhile, the (meth)acrylate-based unit may be, for example, an alkyl(meth)acrylate-based unit. Herein, the alkyl(meth)acrylate-based unit means both an alkylacrylate-based unit and an alkylmethacrylate-based unit, and the alkyl group of the alkyl(meth)acrylate-based unit preferably has a carbon number of 1 to 10, and more preferably has a carbon number of 1 to 4.

In addition, the monomer unit capable of being copolymerized with the (meth)acrylate-based unit may include a styrene-based unit, a maleic anhydride-based unit, a maleimide-based unit and the like. Herein, examples of the styrene-based unit may include, but are not limited to, styrene, α-methylstyrene and the like; examples of the maleic anhydride-based monomer may include, but are not limited to, maleic anhydride, methyl maleic anhydride, cyclohexyl maleic anhydride, phenyl maleic anhydride and the like; and examples of the maleimide-based monomer may include, but are not limited to, maleimide, N-methylmaleimide, N-cyclohexylmaleimide, N-phenylmaleimide and the like. These may be used either alone or as a mixture.

Meanwhile, the acryl-based film may be a film including a (meth)acrylate-based resin having a lactone ring structure. Specific examples of the (meth)acrylate-based resin having a lactone ring structure may include a (meth)acrylate-based resin having a lactone ring structure disclosed in Japanese Patent Application Laid-Open Publication No. 2000-230016, Japanese Patent Application Laid-Open Publication No. 2001-151814 and Japanese Patent Application Laid-Open Publication No. 2002-120326, and the like.

A method for preparing the acryl-based film is not particularly limited, and for example, the acryl-based film may be prepared by preparing a thermoplastic resin composition by sufficiently mixing a (meth)acrylate-based resin, other polymers, additives and the like using any proper mixing method, and then molding the result to a film, or the acryl-based film may be prepared by preparing a (meth)acrylate-based resin, other polymers, additives and the like as a separate solution, then forming a uniformly mixed solution by mixing the separately prepared solutions, and molding the result to a film. In addition, the acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film.

Meanwhile, the polarizing plate of the present invention may further include a primer layer in between the adhesive layer and the protective film for further improving adhesive strength. Herein, the primer layer may be formed using a method of applying a coating solution including a water dispersible polymer resin, water dispersible fine particles and water on the protective film using a bar coating method, a gravure coating method or the like, and drying the result. Examples of the water dispersible polymer resin may include a water dispersible polyurethane-based resin, a water dispersible acryl-based resin, a water dispersible polyester-based resin or a combination thereof, and as the water dispersible fine particles, inorganic-based fine particles such as silica, titania, alumina and zirconia, organic-based fine particles formed with a silicone-based resin, a fluorine-based resin, a (meth)acryl-based resin, a cross-linked polyvinyl alcohol and a melamine-based resin, or a combination thereof, may be used, but the examples are not limited thereto.

3. Optical Member

Next, an optical member according to the present invention will be described.

An optical member of the present invention includes a display panel; and a polarizer attached to an external-most surface of the display panel through a medium of an adhesive layer, wherein the adhesive layer is formed using the radical-curable adhesive composition of the present invention described above.

3-1. Display Panel

First, a display panel capable of being used in the present invention is not particularly limited, and for example, various modes of liquid crystal panels used in liquid crystal display devices may be used. Herein, specific constitutions of the liquid crystal panel are not particularly limited, and for example, the constitution may include upper transparent substrate/color filter/protective film/transparent conductive film electrode/oriented film/liquid crystal/oriented film/thin film transistor/lower transparent substrate, and the like.

The optical member of the present invention may have a polarizer attached to the external-most surface, that is, an upper transparent substrate or a lower transparent substrate, of a display panel through a medium of an adhesive layer, and herein, the adhesive layer is formed using the radical-curable adhesive composition of the present invention described above. Meanwhile, materials of the transparent substrate to which a polarizer is attached through a medium of an adhesive layer are not particularly limited, and known glass substrates or transparent polymer films may be used without limit.

3-2. Polarizer

Next, the polarizer is not particularly limited as described above, and polarizers well known in the art, for example, films formed with polyvinyl alcohol (PVA) including iodine or dichroic dye may be used. In addition, as described above, the polarizer may be prepared by dyeing a PVA film with iodine or dichroic dye, however, the preparation method is not particularly limited thereto.

Meanwhile, the polarizer may attach a separate protective film on the surface opposite to the surface attached to a display panel through a medium of an adhesive layer in order for supporting and protecting the polarizer. Herein, the details of the protective film are the same as those described above.

Meanwhile, attaching the polarizer and the protective film may be carried out using a method of applying an adhesive on the surface of the polarizer or the protective film using a roll coater, a gravure coater, a bar coater, a knife coater or a capillary coater and the like, and then laminating the result with heat using a laminating roll, or laminating by pressing the result at room temperature, or irradiating UV after laminating the result, or the like. Meanwhile, the adhesive is not limited to the radical-curable adhesive of the present invention described above, and various adhesives for a polarizing plate used in the art, such as a polyvinyl alcohol-based adhesive, a polyurethane-based adhesive, an acryl-based adhesive, and a cation-based or radical-based adhesive may be used without limit.

3-3. Adhesive Layer

Next, the adhesive layer is formed using the radical-curable adhesive composition of the present invention described above, and may be formed through an in-line process well known in the art. Specifically, the formation of the adhesive layer may be carried out using, for example, a method in which the radical-curable adhesive composition of the present invention is applied on the surface of a polarizer using a coating method well known in the art, while unwiding the polarizer or a polarizing plate in which a protective film is attached to one surface of the polarizer from a roll, then laminating the result on a display panel, and curing the coated adhesive composition layer. Herein, the curing may be carried out by photocuring as described above. The adhesive layer of the present invention may be formed through an in-line process as described above, and therefore, has an advantage in that productivity is excellent such that continuous production may be obtained.

Meanwhile, the adhesive layer may have a thickness of approximately 0.5 to 10 µm, and preferably approximately 1 to 5 µm. As for existing acryl-based adhesives commonly used for attaching a polarizer (or polarizing plate) to a display panel, at least a thickness of 20 µm is required in order to maintain proper adhesive strength, therefore, manufacturing thin display devices including this adhesive has had a limit, however, the adhesive layer of the present invention may be formed to be thin as described above, and therefore, there is an advantage in that display devices including this adhesive layer may be manufactured to be thinner.

Hereinafter, the present invention will be described in more detail with reference to specific examples.

Preparation Example 1—Preparation of Acryl-Based Protective Film

Raw material pellets were prepared by supplying a resin composition obtained by uniformly mixing poly(N-cyclohexylmaleimide-co-methylmethacrylate), a styrene-maleic anhydride copolymer resin and a phenoxy-based resin in a weight ratio of 100:2.5:5 to a 24φ extruder substituted with nitrogen from a raw material hopper to an extruder, and melting the result at 250° C.

As the phenoxy-based resin, PKFE (Mw=60,000, Mn=16,000, Tg=95° C.) manufactured by InChem Corporation (InChemRez) was used. As the styrene-maleic anhydride copolymer resin, Dylaeck 332 that is 85% by weight of styrene and 15% by weight of maleic anhydride was used, and as the poly(N-cyclohexylmaleimide-co-methylmethacrylate) resin, a compound having the N-cyclohexylmaleimide content in 6.5% by weight when analyzed using an NMR was used.

The obtained raw material pellets were vacuum dried, were melted at 260° C. using an extruder, then passed through a coat-hanger-type T-die, and then passed through a chrome plating casting roll and a drying roll, and as a result, a film having a thickness of 150 µm was prepared. An acrylic film was prepared by orienting this film to a percentage of 170% in an MD direction at 125° C. using the speed difference of the rolls with a pilot orientation apparatus.

The acrylic film prepared through the process described above was corona treated, and a primer composition, in which 20 parts by weight of an oxazoline cross-linking agent (manufactured by Nippon Shokubai Co. Ltd., WS700) was added to a primer composition having a solid content of 10% by weight prepared by diluting CK-PUD-F (urethane dispersion manufactured by Chokwang Paint Ltd.) with pure water, was coated on one surface of the acrylic film using a #7 bar, and the result was oriented to a percentage of 190% in a TD direction at 130° C. using a tenter, and finally, an acryl-based protective film having a primer layer thickness of 400 nm was prepared.

Preparation Example 2—Preparation of Adhesive Composition (1) Adhesive Composition A Adhesive Composition A was prepared by mixing 20 parts by weight of itaconic anhydride, 15 parts by weight of 2 hydroxyethylvinylether, 57 parts by weight of 2-hydroxyethyl acrylate, 3 parts by weight of a radical initiator (Igarcure 819), and 5 parts by weight of diphenyl(4 phenylthio)phenylsulfonium hexafluoroantimonate, a cation generator.

(2) Adhesive Composition B

Adhesive Composition B was prepared by mixing 20 parts by weight of maleic anhydride, 15.7 parts by weight of 2-hydroxyethylvinylether, 56.3 parts by weight of 2-hydroxyethyl acrylate, 3 parts by weight of a radical initiator (Igacure 819), and 5 parts by weight of diphenyl(4-phenylthio)phenylsulfonium hexafluoroantimonate, a cation generator.

(3) Adhesive Composition C

Adhesive Composition C was prepared by mixing 20 parts by weight of maleic anhydride, 15.3 parts by weight of vinyl acetate, 56.7 parts by weight of 2-hydroxyethyl acrylate, 3 parts by weight of a radical initiator (Igacure 819), and 5 parts by weight of diphenyl(4-phenylthio)phenylsulfonium hexafluoroantimonate, a cation generator.

(4) Adhesive Composition D

Adhesive Composition D was prepared by mixing 20 parts by weight of acrylomorpholine, 40 parts by weight of hydroxyethyl acrylamide, 37 parts by weight of hydroxyethyl acrylate, and 3 parts by weight of a radical initiator (Igacure 819).

(5) Adhesive Composition E

Adhesive Composition E was prepared by mixing 15 parts by weight of maleic anhydride, 19 parts by weight of 2-hydroxyethylvinylether, 58 parts by weight of 2-hydroxyethyl acrylate, 3 parts by weight of a radical initiator (Igacure 819), and 5 parts by weight of diphenyl(4-phenylthio)phenylsulfonium hexafluoroantimonate, a cation generator.

(6) Adhesive Composition F

Adhesive Composition F was prepared by mixing 28 parts by weight of maleic anhydride, 16 parts by weight of 2-hydroxyethylvinylether, 49 parts by weight of 2-hydroxyethyl acrylate, 3 parts by weight of a radical initiator (Igacure 819), 4 parts by weight of diphenyl(4-phenylthio)phenylsulfonium hexafluoroantimonate, a cation generator.

Example 1

The Adhesive Composition A was applied on the primer layer of the acrylic film-based protective film prepared in Preparation Example 1 using a dropping pipette, and the result was laminated on both surfaces of a polarizer (PVA element), and then the result passed through a laminator after setting the condition of the adhesive layer to have a final thickness of 1 to 2 µm. Next, ultraviolet rays of 900 mJ/cm$^2$ irradiated on the surface laminated with the acrylic film using a UV irradiator (fusion lamp, D bulb), and as a result, a polarizing plate was prepared. The polarizing plate was prepared in a constant temperature and constant humidity environment of a temperature of 20° C. and humidity of 50%.

Example 2

A polarizing plate was prepared in the same manner as in Example 1 except that Adhesive Composition B was used instead of Adhesive Composition A.

Example 3

A polarizing plate was prepared in the same manner as in Example 1 except that Adhesive Composition C was used instead of Adhesive Composition A.

Comparative Example 1

A polarizing plate was prepared in the same manner as in Example 1 except that Adhesive Composition D was used instead of Adhesive Composition A.

Comparative Example 2

A polarizing plate was prepared in the same manner as in Example 1 except that Adhesive Composition E was used instead of Adhesive Composition A.

Comparative Example 3

A polarizing plate was prepared in the same manner as in Example 1 except that Adhesive Composition F was used instead of Adhesive Composition A.

An equivalence ratio of mixing of the acid anhydride-based compound and the vinyl-based compound of the radical-curable adhesive composition used in the examples and the comparative examples represented by Equation (1) was calculated and shown in the following [Table 1].

Herein, M, the number of carbon-carbon unsaturated double bonds capable of participating in polymerization included in the acid anhydride-based compound, was calculated as the sum of (the number of carbon-carbon unsaturated double bonds capable of participating in the polymerization of each acid anhydride-based compound)×(a molar fraction of the corresponding acid anhydride-based compound), and N, the number of carbon-carbon unsaturated double bonds capable of participating in polymerization included in the vinyl-based compound, was calculated as the sum of (the number of carbon-carbon unsaturated double bonds capable of participating in the polymerization of each vinyl-based compound)×(a molar fraction of the corresponding vinyl-based compound).

In addition, peel strength of the polarizing plate prepared in the examples and the comparative examples, and a glass transition temperature and water resistance of the cured adhesive were measured and shown in the following [Table 1]. The measurement methods are as follows.

1. Evaluation on peel strength of polarizing plate: a peeling test was carried out using a polarizing plate cut into pieces having a width of 20 mm, and a length of 100 mm, and the peel strength of the polarizer and the protective film was measured at a speed of 300 m/min and 90 degrees using a texture analyzer apparatus (TA-XT Plus manufactured by Stable Micro Systems, Ltd.). Herein, the peel strength of greater than 2.5 N/2 cm was marked as ⊚, the peel strength of 1.5 to 2.5 N/2 cm was marked as ○, and the peel strength of less than 1.5 N/2 cm was marked as X.

2. Evaluation on glass transition temperature: a slice of the cured adhesive of the polarizing plate was taken and a glass transition temperature was measured using a differential scanning calorimetry (DSC, manufactured by Mettler-Toledo International, Inc.). The measurement temperature range was −30° C. to 200° C., and scanning was carried out twice by 10° C. each per minute, and the measured glass transition temperature is a glass transition temperature at the second scanning.

3. Evaluation on water resistance: the polarizing plate was laminated on a glass substrate, and then immersed in a thermostat at 60° C. Water resistance was determined after 24 hours by the discoloration at the end of the polarizing plate, and when there was no deformation, it was marked as excellent, and when there was discoloration, it was marked as poor.

TABLE 1

| Category | Composition | Equivalence Ratio of Mixing | Water Resistance | Peel Strength | Glass Transition Temperature [° C.] | Others |
|---|---|---|---|---|---|---|
| Example 1 | A | 1 (M:N = 1:1) | Excellent | ⊚ | 67 | — |
| Example 2 | B | 1 (M:N = 1:1) | Excellent | ○ | 63 | — |
| Example 3 | C | 1 (M:N = 1:1) | Excellent | ○ | 74 | — |
| Comparative Example 1 | D | — | Poor | ⊚ | 76 | — |
| Comparative Example 2 | E | 0.69 (M:N = 1:1.45) | Poor | X | — | No Curing |
| Comparative Example 3 | F | 1.28 (M:N = 1:0.78) | Poor | X | — | No Curing |

As shown in Table 1, in Examples 1 to 3, it was seen that adhesive strength was excellent, water resistance was excellent, and glass transition temperatures were high.

However, in Comparative Example 1 securing adhesive strength through hydrogen bonding, it was seen that, although adhesive strength was excellent, water resistance was very poor.

In addition, in Comparative Examples 2 and 3 that do not satisfy the equivalence ratio of mixing specified in the present invention, it was seen that copolymerization did not favorably occur since the acid anhydride-based compound and the vinyl-based compound did not form sufficient charge complexes, and consequently, adhesive strength and water resistance were all poor.

Next, an experiment was carried out as follows in order to show that the adhesive composition of the present invention is also useful in attaching a polarizer to a display panel.

Example 4

The Adhesive Composition A was applied on a glass substrate, and a polarizer (PVA element) was laminated thereon, and then the result passed through a laminator (5 m/min) after setting the condition of the adhesive layer to have a final thickness of 1 to 2 μm. Next, ultraviolet rays of 1000 mJ/cm$^2$ irradiated on the surface laminated with the glass substrate using a UV irradiator (metal halide lamp), and as a result, an optical member in which the polarizer is attached to the glass substrate was prepared. Meanwhile, the optical member was prepared under a condition of a temperature of 20° C. and humidity of 50%.

Peel strength of the polarizing plate prepared in Example 4 was measured and shown in the following [Table 2]. Specifically, the optical member prepared in Example 4 was left unattended for 4 days under a condition of a temperature of 20° C. and humidity of 70%, then cut into pieces having a width of 20 mm, and a length of 100 mm, and the peel strength of the polarizer and the glass substrate was measured at a speed of 300 m/min and 90 degrees using a texture analyzer apparatus (TA-XT Plus manufactured by Stable Micro Systems, Ltd.). Herein, the peel strength of greater than 2.5 N/2 cm was marked as ⊚, the peel strength of 1.5 to 2.5 N/2 cm was marked as ○, and the peel strength of less than 1.5 N/2 cm was marked as X. Meanwhile, methods for measuring an equivalence ratio of mixing, water resistance and a glass transition temperature additionally listed in the following [Table 2] were the same as those described above.

TABLE 2

| Category | Composition | Equivalence Ratio of Mixing | Water Resistance | Peel Strength | Glass Transition Temperature [° C.] |
|---|---|---|---|---|---|
| Example 4 | A | 1 (M:N = 1:1) | Excellent | ○ | 67 |

As shown in Table 2, it was seen that the adhesive composition of the present invention also had excellent adhesive strength between the polarizer and the glass substrate, had excellent water resistance, and a high glass transition temperature, thereby had excellent heat resistance reliability compared to existing acryl-based adhesives.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:

1. A radical-curable adhesive composition comprising:
   an acid anhydride-based compound having at least one carbon-carbon unsaturated double bond;
   a vinyl-based compound having at least one electron donor group;
   a radical initiator; and a cation generator, wherein a content of the acid anhydride-based compound and the vinyl-based compound is 0.8 to 1.0 by an equivalence ratio of mixing represented by the following Equation (1):

Equivalence Ratio of Mixing=$M/N$, and           Equation (1):

wherein in Equation (1), M is the number of carbon-carbon unsaturated double bonds capable of participating in polymerization in the molecule including an acid anhydride group included in the acid anhydride-based compound; and N is the number of carbon-carbon unsaturated double bonds capable of participating in polymerization in the molecule included in the vinyl-based compound.

2. The radical-curable adhesive composition of claim 1, wherein the acid anhydride-based compound includes one or more types of compounds selected from the group consisting of compounds represented by the following [Chemical Formula I] to [Chemical Formula IV]:

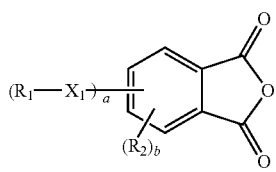

[Chemical Formula I]

wherein, in [Chemical Formula I], $R_1$ is a (meth)acryloyl group, a (meth)acryloylalkyl group or a (meth)acryloyloxyalkyl group; $R_2$ is a halogen atom or a $C_{1\sim10}$ alkyl group; a is an integer of 1 or 2; b is an integer of 0 to 2; and $X_1$ is a single bond, —O—, —CO—, —COO— or —OCO—;

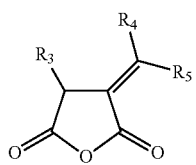

[Chemical Formula II]

wherein in [Chemical Formula II], $R_3$ to $R_5$ are each independently hydrogen or a halogen atom; or a $C_{1\sim10}$ alkyl group, a $C_{4\sim14}$ cycloalkyl group, a $C_{6\sim14}$ aryl group or a combination thereof;

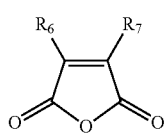

[Chemical Formula III]

wherein in [Chemical Formula III], $R_6$ and $R_7$ are each independently hydrogen or a halogen atom; or a $C_{1\sim10}$ alkyl group, a $C_{4\sim14}$ cycloalkyl group, a $C_{6\sim14}$ aryl group or a combination thereof; and

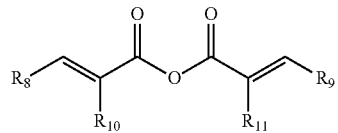

[Chemical Formula IV]

wherein in [Chemical Formula IV], $R_8$ to $R_{11}$ are each independently hydrogen or a halogen atom; or a $C_{1\sim10}$ alkyl group, a $C_{4\sim14}$ cycloalkyl group, a $C_{6\sim14}$ aryl group or a combination thereof.

3. The radical-curable adhesive composition of claim 1, wherein the electron donor group of the vinyl-based compound is a functional group represented by the following [Chemical Formula A] or [Chemical Formula B]:

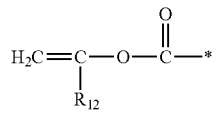

[Chemical Formula A]

wherein, in [Chemical Formula A], $R_{12}$ is hydrogen or a $C_{1\sim10}$ alkyl group; and

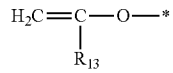

[Chemical Formula B]

wherein in [Chemical Formula B], $R_{13}$ is hydrogen or a $C_{1\sim10}$ alkyl group.

4. The radical-curable adhesive composition of claim 1, wherein the vinyl-based compound is a compound represented by the following [Chemical Formula V]:

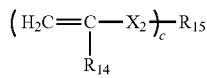

[Chemical Formula V]

wherein, in [Chemical Formula V], $R_{14}$ is hydrogen or a $C_{1\sim10}$ alkyl group; $R_{15}$ is a $C_{1\sim10}$ aliphatic chain, a $C_{4\sim14}$ aliphatic ring or a $C_{6\sim14}$ aromatic ring, which has a valency of c, or a combination thereof; c is an integer of 1 to 4; and $X_2$ is —O— or —OCO—.

5. The radical-curable adhesive composition of claim 1, further comprising a radical-polymerizable compound represented by the following [Chemical Formula VI]:

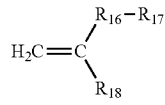

[Chemical Formula VI]

wherein, in [Chemical Formula VI], $R_{16}$ is an ester group (—COO—), an amide group (—CON—) or a thioate group (—COS—); $R_{17}$ is a $C_{1\sim10}$ alkyl cycloalkyl group or a group, a $C_{4\sim10}$ combination thereof, and herein, $R_{17}$ has at least one hydroxyl substituent in the molecule; and $R_{18}$ is hydrogen or a $C_{1\sim10}$ alkyl group.

6. The radical-curable adhesive composition of claim 5, comprising:
   the acid anhydride-based compound and the vinyl-based compound in 1 to 50 parts by weight;
   the radical-polymerizable compound in 40 to 97 parts by weight;
   the radical initiator in 1 to 10 parts by weight; and
   the cation generator in 1 to 10 parts by weight, with respect to 100 parts by weight of the radical-curable adhesive composition.

7. The radical-curable adhesive composition of claim 1, which has a glass transition temperature of 60° C. or higher after curing.

8. The radical-curable adhesive composition of claim 1, which has viscosity of 10 to 200 cP.

9. A polarizing plate comprising:
   a polyvinyl alcohol-based polarizer;
   an adhesive layer formed on at least one surface of the polarizer; and
   a protective film formed on the adhesive layer,
   wherein the adhesive layer is formed using the radical-curable adhesive composition of claim 1.

10. The polarizing plate of claim 9, wherein the polarizer and the adhesive layer secure adhesive strength through covalent bonding produced as a result of an esterification reaction between a hydroxyl group of the polarizer and an acid anhydride group of the adhesive layer.

11. An optical member comprising:
   a display panel; and
   a polyvinyl alcohol-based polarizer attached to an external-most surface of the display panel through a medium of an adhesive layer,
   wherein the adhesive layer is formed using the radical-curable adhesive composition of claim 1.

12. The optical member of claim 11, wherein the polarizer and the adhesive layer secure adhesive strength through covalent bonding produced as a result of an esterification reaction between a hydroxyl group of the polarizer and an acid anhydride group of the adhesive layer.

* * * * *